Patented Mar. 11, 1941

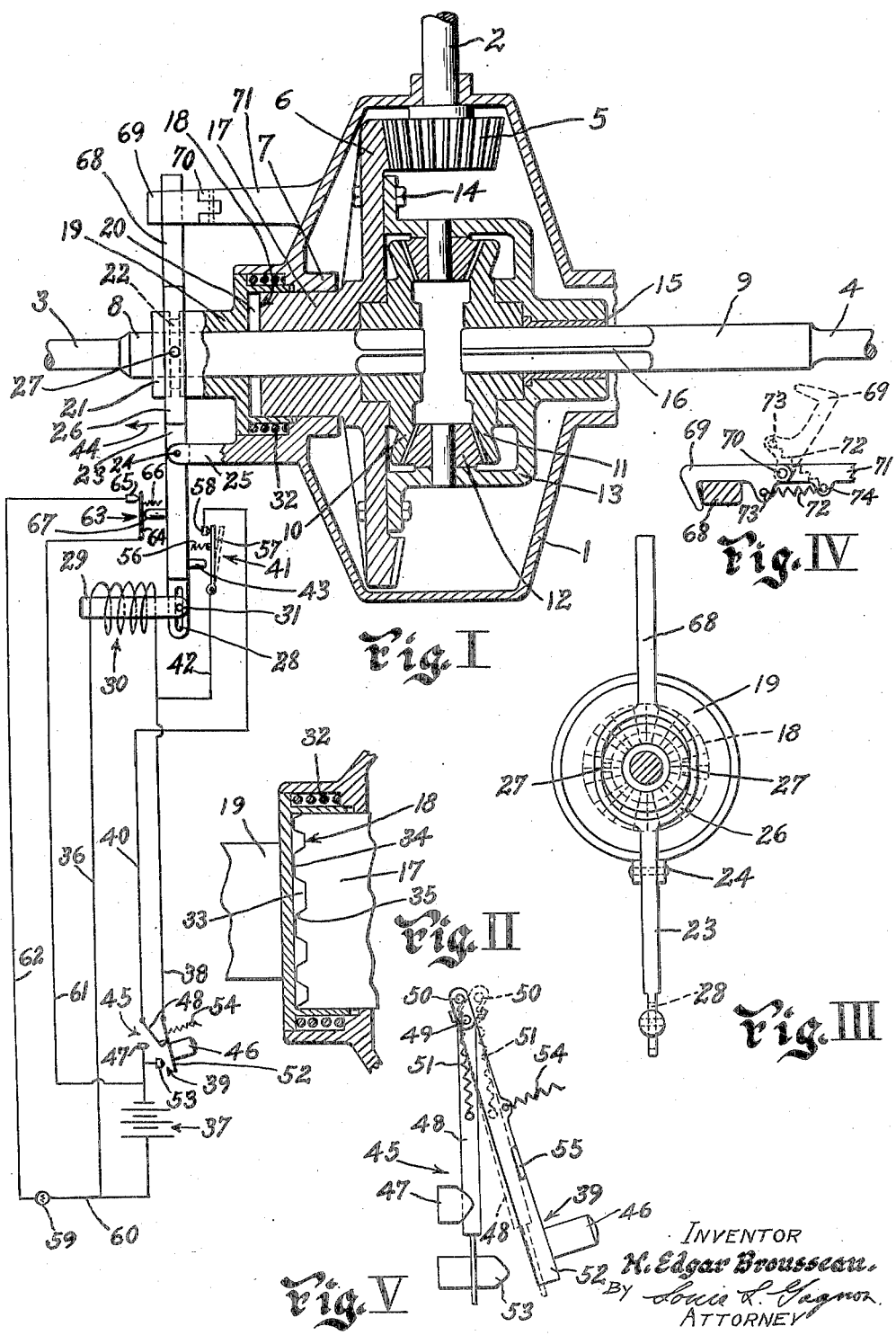

2,234,890

UNITED STATES PATENT OFFICE 2,234,890

DIFFERENTIAL MECHANISM

Henry Edgar Brousseau, Southbridge, Mass.

Application October 24, 1939, Serial No. 301,012

16 Claims. (Cl. 74—316)

This invention relates to improvements in differentials of motor driven machines, particularly automobiles, and has particular reference to improve means and method of making the same.

One of the principal objects of the invention is to provide a differential device for automobiles with which a positive driving action may be imparted to one or both of the drive wheels of said automobile and when desirable to resist differential action.

Another object of the invention is to provide remote control means in conjunction with differentials of motor driven vehicles whereby direct driving may be imparted to both of the drive wheels of said vehicle when there is a loss of traction to one of said drive wheels and to provide automatic functioning means for resisting driving action to both of the drive wheels when an excessive load is imparted to the differential mechanism or to revert back to conventional differential action.

Another object is to provide an improved form of differential gear controlled mechanism which may be thrown in or out of action at the will of the operator according to circumstances, and which will permit unrestrained differential action under normal conditions and permit of resisting the differential action so as to insure that a predetermined amount of tractive power may be delivered to each driven wheel regardless of the condition of the roadway or the fluctuation of the tractive load on the wheels.

Another object is to provide electrical operated mechanism associated with differential mechanism of the type whereby a predetermined amount of tractive power may be delivered to each drive wheel of a motor vehicle.

Another object is to provide a telltale light associated with the mechanism for imparting a positive driving action to both of the wheels of said automobile so as to indicate when said mechanism is in or out of operative position.

Another object is to provide auxiliary manually operable mechanism in combination with automatically functioning mechanism for imparting a positive driving action to both of the drive wheels of an automobile in emergency cases such as when there is a loss of traction or motion of differential action through a broken axle.

Another object is to provide an effective floating power force in conjunction with automatically operating mechanism for resisting differential action so as to impart a positive driving action to both of the drive wheels of a motor vehicle.

Other objects and advantages of the invention will become apparent from the following descriptions taken in conjunction with the accompanying drawing and it will be apparent that many changes may be made in the details of construction, arrangement of parts and methods shown and described without departing from the spirit of the invention as expressed in the accompanying claims.

I, therefore, do not wish to be limited to the exact details of construction, arrangement of parts or methods shown and described as the preferred forms only have been given by way of illustration.

Referring to the drawing:

Fig. I is a sectional plan view of differential gearing constructed according to the invention;

Fig. II is a fragmentary partially sectional view of the clutch of the device embodying the invention;

Fig. III is an end view of the clutch shifting mechanism illustrated in Fig. I;

Fig. IV is a fragmentary view of the latch means for holding the manually operable clutch shift means of the device embodying the invention; and Fig. V is a fragmentary enlarged view of the switch member for controlling the energizing of the circuit of the device embodying the invention.

Referring more particularly to the drawing wherein like characters of reference designate like parts throughout the several views, the device embodying the invention comprises the usual frame structure or housing 1, power shaft 2, and driven shafts 3 and 4.

The power shaft 2 is provided with a pinion gear 5 which meshes with a gear 6 normally loosely journaled concentric with the shaft 3 internally of a bearing 7.

Each of the shafts 3 and 4 have enlarged or reinforced end portions 8 and 9 normally of a larger diameter than the remainder of the shafts so as to insure the shafts against breakage internally of the differential mechanism. Each of said shafts is provided adjacent the inner ends thereof with bevel-gears 10 and 11 keyed thereto so as to rotate with said shafts. The bevel-gears 10 and 11 are in constant mesh with a plurality of planetary gears 12 rotatably carried by a planetary gear housing 13. The planetary gear housing 13 is secured to the gear 6 by bolts or the like 14 and is loosely journaled on a bearing 15 attached adjacent the inner end 16 of the shaft 4.

The gear 6 is provided with a shank portion 17 having a clutch face 18. Slidably keyed to the shaft 3 there is provided a clutch element 19 having a clutch face 20 for engagement with the clutch face 18 of the shank 17 of the gear 6. The clutch element 19 has a shank 21 provided with a circumferential groove 22. A lever 23, pivotally supported at 24 to a projecting member 25 on the housing 1, is provided with a spanning portion 26 having diametrically opposed pin members 27 fitting within the circumferential groove 22. The lever 23 is provided adjacent its free end with a slotted portion 28 to which the core 29 of a solenoid 30 is pivotally and slidably attached as illustrated at 31. The solenoid is of the type that when energized the core 29 is drawn inwardly thereof and is adapted to pull the lever 23 toward the coil of said solenoid and simultaneously move the clutch element 19, keyed to the shaft 3, into engagement with the clutch face 18 of the shank portion 17. A coil spring or the like 32 is normally adapted to urge the clutch element 19 out of engagement with the clutch face 18 but, when the solenoid 30 is energized and the clutch element 19 is moved toward the clutch face 18, the pull of the solenoid is such as to compress the coil spring so as to permit the clutch element 19 to engage with the clutch face 18 and be held in engagement therewith by the force of said solenoid. When, however, the solenoid is de-energized the coil spring, tending to return to its initial set, will force the clutch element 19 permanently out of engagement with the clutch face 18. The solenoid, by reason of the fact that it is electrically operated, provides a floating power force for urging the clutch element 19 into engagement with the clutch face 18 and is such that if the interengaging members of the clutch element 19 are not aligned with the interengaging members of the clutch face 18 there will be no jamming or buckling of the clutch engaging mechanism such as would be the case if a positive mechanical force were employed. The force of the solenoid would be resisted only to the extent as to permit the interengaging members of the clutch to interfit with each other when moved into aligned relations. It is particularly pointed out that the interengaging members 33 and 34 of the clutch are provided with angularly disposed side surfaces 35. The purpose of these angled side surfaces is to provide means whereby the said interengaging member may be cammed or wedged out of engagement with each other when a certain predetermined torsional strain is exceeded. This arrangement provides means whereby the clutch members may be disengaged when the load exceeds an amount which the differential gearing cannot withstand and guards against breakage of the differential gearing mechanism.

The solenoid 30 is connected through a suitable lead wire 36 to one pole of a suitable source of electrical energy 37 such as the automobile battery or an auxiliary battery. The solenoid 30 is also connected to the opposite pole of the source of electrical energy 37 by means of a lead wire 38 having its circuit completed by means of a manually operable switch member 39. A lead wire 40, also connected to said latter pole of the source of electrical energy, is directed to a switch 41 having a connection with the lead wire 38 through a circuit wire 42. The switch 41 is adapted to close the circuit to the solenoid when the switch 39 has been initially closed to temporarily energize the solenoid to pull the core 29 connected with the lever 23 inwardly thereof to move the clutch element 19 into engagement with the clutch face 18. The switch 41 is normally held open by a pin or the like 43 when the solenoid is de-energized and the lever 23 is moved in the direction indicated by the arrow 44, the said movement being brought about by the coil spring 32 forcing the clutch element 19 out of engagement with the clutch face 18. A second switch 45 is provided in the circuit 40 of the switch 41. This switch 45 is adapted to be closed when the finger piece 46 of the switch 39 is compressed to close the switch 39. The switch 45, as illustrated in Fig. V comprises a contact 47 and a blade 48. The blade 48 is pivoted at 49 so that it may be moved toward or away from the contact 47. A floating member 50 also pivoted at 49 cooperatively functioning with a spring 51 is adapted to move to opposite sides of the pivot 49 when the blade 48 is moved toward or away from the contact 47 and is so arranged as to hold the blade 48, in one position of movement, in engagement with the contact 47 and, in another position of movement, to hold the blade 48 out of engagement with the contact 47 as illustrated by the dash lines. The switch 39 is provided with a blade 52 normally urged in a direction away from its contact 53 by a coil spring 54. The said blade 52 is provided with a protrusion 55 which is adapted to overlie the blade 48 when in its position out of engagement with the contact 47. The protrusion 55, when the switch 39 is compressed to initially close the circuit 38 to the solenoid, is adapted to simultaneously force the blade 48 of the switch 45 to a position whereby the spring 51 will urge said blade 48 into engagement with the contact 47. Further movement of the blade 52 causes said blade to engage with the contact 53 closing the circuit to the solenoid thereby energizing said solenoid causing the core 29 thereof to move inwardly of said solenoid and simultaneously pull the lever 23 in the direction of said solenoid. This pulling of the lever 23 toward said solenoid moves the clutch element 19 into engagement with the clutch face 18 and simultaneously allows a coil spring 56 to move the blade 57 of switch member 41 into engagement with the contact 58 of said switch thereby closing the circuit lines 40 and 42 to the solenoid 30. When in this position the circuit lines 40 and 42 maintain the solenoid 30 energized so that when pressure is released on the thumb piece 46 of the switch 39 and the coil spring 54 opens said switch the solenoid will not be de-energized through the opening of said latter switch 39.

When the solenoid is retained energized through the closing of the switch 41 as described above the clutch element 19 will be held in engagement with the clutch face 18 by said solenoid. When in this position a positive driving action will be imparted to both of the shafts 3 and 4. If a torsional strain or overload is directed to the gearing of the driving mechanism by reason of stress in excess of a predetermined amount and the clutch element 19 is wedged or cammed outwardly of the clutch face 18 the pin 43 will engage the blade 57 of the switch 41 and force said blade out of engagement with the contact 58 and thereby break the circuit to the solenoid 30. This will automatically deenergize the solenoid and allow the spring 32 to permanently hold the clutch element 19 out of engagement with the clutch face 18, returning said driving mechanism to normal differential action. If, however, the load is not such as to cause the clutch element 19 to be forced out of engagement with the clutch face 18, but it is desirable to de-energize the solenoid 30, the blade 48 of the switch 45 may be manually operated to disengage said blade from the contact 47 whereby the circuit to the solenoid may be manually opened and the said solenoid thereby de-energized. The switch members 39 and 45 are adapted to be positioned adjacent the driver of the vehicle, either on the dash-board or floor-board, so that he has ready access thereto.

A telltale light 59 is provided so that the operator will know when the clutch element 19 is in or out of engagement with the clutch face 18. This telltale light 59 is connected through the lead wire 60 to one pole of the battery and is connected through suitable lead wires 61 and 62 and a switch member 63 to the opposite pole of said battery.

The switch 63 is provided with a blade 64 normally held out of engagement with the contact 65 of said switch by a spring 66. The lever 23 is provided with a pin 67 which, when the lever is drawn toward the solenoid 30 to engage the clutch element 19 with the clutch face 18, is adapted to move the blade 64 against the action of the spring 66 into engagement with the contact 65 thereby closing the circuit to the telltale light 59 causing the said light to be illuminated when the clutch element 19 is in engagement with the clutch face 18. It is apparent that when the lever 23 is moved in the opposite direction the pin 67 will move out of engagement with the blade 64 and allow the said blade to move away from the contact 65 under the action of the spring 66.

The lever 23 is provided with an opposed extension 68 adapted to be manually operated to move the clutch element 19 into engagement with the clutch face 18. The extension 68 is retained in its position of holding the clutch element 19 in engagement with the clutch face 18 by a latch member 69, see Fig. IV. The latch member 69 is pivotally supported at 70 on an extension 71 on the differential housing 1. A coil spring 72 attached at 73, adjacent one end thereof to the latch 69 and at 74 adjacent its opposite end to the extension 71, is adapted to hold the latch 69 in engagement with the extension 68 and is adapted to hold the latch out of engagement with the extension 68 as shown in dash lines when the latch is swung upwardly, see Fig. IV.

The operation of the device is such that when the clutch elements 18 and 19 are disengaged the power is transmitted as usual so that the driven shafts will each receive an equal amount of power when the tractive resistance of the vehicle wheels is equalled. When the vehicle is driven in a curve, the wheel traversing the path of lesser radius slows down accordingly, while the wheel traversing the path of greater radius increases its speed as usual.

When, however, the pavement is slippery or the vehicle is on a steep grade or when the road is rough so that a wheel is sometimes lifted clear of the road, the operator may prevent skidding, racing of the engine, loss of traction, and other troubles inherent in the usual differential gearing by closing the switch 39 causing the clutch members 18 and 19 to engage and impart a positive driving action to both of the wheels and thereby preventing free differential action. If, then, due to road conditions or the manner of operating the vehicle, one of the driven wheels loses its tractional hold on the road, the clutch will insure an amount of power, up to the limit of the holding power of the clutch elements 18 and 19, to be positively delivered to both driven shafts, but if the circumstances are such that the strain on the clutch is sufficient to overcome the holding power of the inclined surfaces 35, then the said clutch elements will be forced to part causing the switch 41 to be tripped and the solenoid to be de-energized. This allows the spring 32 to hold the clutch element 19 out of engagement of the clutch face 18 and permits normal differential action to take place thereby preventing excessive strain on the gearing.

The arrangement described above is also particularly advantageous in instances where an axle breaks as a positive driving action can be imparted to either of said axles through engagement of the clutch element 19 with the clutch face 18, it being remembered that the axles 3 and 4 are provided with enlarged portions 8 and 9 respectively which insures the axles against breakage internally of the mechanism embodying the invention.

The manually operable arrangement embodying the extension 68 and latch member 69 is adapted for use only when the automatically functioning electrical apparatus cannot be used either because of lack of suitable electrical energy or for other reasons. It is preferable however to employ said electrical arrangement as the differential gearing will be automatically protected against breakage which is not the case when the latch member 69 and extension 68 are employed. This manually operable engaging of the clutch element 19 with the clutch face 18 through the extension 68 and latch member 69 is adapted for use only in emergency cases when the other electrically operated mechanism cannot be used.

From the foregoing description it will be seen that simple efficiency, and economical means and methods have been provided for accomplishing all of the objects and advantages of the invention.

Having described my invention, I claim:

1. In a device of the character described the combination of a driving member and a pair of driven members, a clutch interposed between two of said members, said clutch comprising a pair of elements having coacting shoulders on their opposed faces, yielding means for normally holding said elements in disengaged relation with each other and automatically releasable means operable against the action of said resilient means for holding said elements in driving relation with each other and functioning automatically to release the holding action of said means operable against the action of said resilient means when a predetermined overload is exerted on said clutch elements.

2. In a device of the character described the combination of a driving member and a pair of driven members, a clutch interposed between two of said members having coacting faces and electrically operated automatically releasable means for normally holding said faces in driving relation with each other and functioning automatically to release the holding action of said electrically operated means when a predetermined overload is exerted on said clutch elements.

3. In a device of the character described the combination of a driving member and a pair of driven members, a clutch interposed between two of said members having elements provided with coacting faces, a lever associated with one of said elements for moving said faces toward and away from each other, resilient means for normally urging one of said elements away from the other, and automatically functioning electrically operated means associated with said lever for moving said elements toward each other against the action of the resilient means to engage said coacting faces and functioning automatically for releasing the moving of said elements towards each other when a predetermined overload is exerted on said clutch elements.

4. In a device of the character described the combination of a driving member and a pair of driven members, a clutch interposed between two of said members having opposed members with shouldered coacting faces, and floating power force means for urging said shouldered faces into engagement with each other, said shouldered faces being inclined and adapted to disengage said shoulder coacting faces of said members when the load thereon exceeds a predetermined amount and means operable simultaneous to the disengagement of said coacting faces for rendering the floating power force means ineffective.

5. In a device of the character described the combination of a driving member and a pair of driven members, a clutch interposed between two of said members having elements with coacting faces, means for resiliently urging said faces out of engagement with each other, and means for urging said faces into engagement with each other against said means for normally urging them out of engagement, said faces being so arranged as to oppose the means for moving them into engagement with each other and automatically operating means for holding said faces disengaged when the load on said clutch exceeds a predetermined amount.

6. In a device of the character described the combination of a driving member and a pair of driven members, a clutch having engageable portions interposed between two of said members, means for normally urging said engageable portions out of engagement with each other, electrically operable means which, when energized, is adapted to urge said engageable portions into engagement with each other and means for deenergizing said electrically operable means when the load on the clutch exceeds a predetermined amount whereby said means for normally urging said engageable portions out of engagement with each other will be free to function.

7. In a device of the character described the combination of a driving member and a pair of driven members, a clutch comprising a pair of elements interposed between two of said members, spring means for normally urging one of said elements out of engagement with the other, a lever pivotally supported in cooperative relation with one of said elements, solenoid means which, when energized, will move said lever and in turn move said clutch element into engagement with the other against the action of the resilient means, and remote control means for energizing said solenoid.

8. In a device of the character described the combination of a driving member and a pair of driven members, a clutch comprising a pair of elements interposed between two of said members, spring means for normally urging one of said elements out of engagement with the other, a lever pivotally supported in cooperative relation with one of said elements, solenoid means which when energized, will move said lever and in turn move said clutch element into engagement with the other against the action of the resilient means, remote control means for energizing said solenoid and means which, when the load on the clutch exceeds a predetermined amount, will deenergize the solenoid and allow the resilient means to function and disengage the clutch elements.

9. In a device of the character described the combination of a driving member and a pair of driven members, a clutch comprising a pair of engageable elements interposed between two of said members and electrically operable means including an electrical circuit and make and break switch means associated with said clutch for exerting an electrical force to move one of said elements towards the other and means for deenergizing the electrically operable means when one of said clutch elements is moved away from the other.

10. In a device of the character described the combination of a driving member, a pair of driven members, a train of gears associated with said members, a clutch interposed between one of said driven members and a train of gears for driving said members, said clutch having elements movable toward and away from each other, means for normally urging one of said elements away from the other, electrically operable means for moving said elements into engagement with each other against the action of the means for normally moving them out of engagement, an electrical circuit for connecting said electrically operable means to a source of electrical energy and manually operable remote control means for closing the circuit to energize said elements and to move said clutch elements into engagement with each other and circuit breaking means in said electrical circuit for breaking the electrical circuit to said electrically operable means when the clutch elements are moved out of engagement with each other through an overload on said clutch elements in excess of a predetermined amount for automatically deenergizing said electrically operable means and to permit the clutch elements to be normally held out of engagement with each other.

11. In a device of the character described, electrically operable means, circuit means for connecting a source of electrical energy with said electrically operable means, manually operable remote control means in said circuit to open or close said circuit, auxiliary switch means in said circuit which, when the remote control means is operated to initially energize said circuit to introduce an electrical force to cause a portion of the electrically operable means to move, is adapted to be operated to retain said circuit closed, and an additional switch member in said circuit for automatically breaking said circuit when said portion of the electrically operable means is moved in a direction opposite its movement under said electrical force.

12. In a device of the character described the combination of a driving member and a pair of members to be driven, a clutch operably associated with at least two of said members and having opposed members with coacting faces, means for normally urging said coacting faces out of engagement with each other, force exerting means for urging said coacting faces into engagement with each other against said means for normally holding them disengaged and means for automatically rendering said force exerting means inoperative when a predetermined overload is exerted on said clutch members.

13. In a device of the character described the combination of a driving member and a pair of members to be driven, said members to be driven being respectively mounted on a shaft, gear means mounted on said respective shafts, clutch means associating said means to be driven with said driving means, said clutch having opposed members with coacting faces, means for normally urging said coacting faces out of engagement with each other, force exerting means for urging said coacting faces into engagement with each other against said means for normally holding them disengaged and means for automatically rendering said force exerting means inoperative when a predetermined overload is exerted on said members.

14. In a device of the character described the combination of a driving member and a pair of members to be driven, said members to be driven being respectively mounted on a shaft, gear means mounted on said respective shafts, clutch means associating said means to be driven with said driving means, said clutch having opposed members with coacting faces, means for normally urging said coacting faces out of engagement with each other, force exerting means for urging said coacting faces into engagement with each other against said means for normally holding them disengaged and means for automatically rendering said force exerting means inoperative when a predetermined overload is exerted on said members, at least one of said shaft members having a reinforced portion adjacent the gear means.

15. In a device of the character described the combination of a driving member and a pair of members to be driven, a clutch operably associated with at least two of said members and having opposed members with coacting faces, means for normally urging said coacting faces out of engagement with each other, force exerting means for urging said coacting faces into engagement with each other against said means for normally holding them disengaged, means for automatically rendering said force exerting means inoperative when a predetermined overload is exerted on said clutch members, and auxiliary manually operable means for engaging said coacting faces against the action of said means for normally holding said coacting faces disengaged and functioning independently of said force exerting means.

16. In a device of the character described a driving member, a pair of members to be driven, differential gearing associated with said members to be driven, a clutch for embedding a positive driving action to one of said members to be driven which, in turn, embeds a positive drive through said differential gearing to said other member to be driven, said clutch having opposed coacting faces, means for normally urging said coacting faces out of engagement with each other, force exerting means for urging said coacting faces into engagement with each other against said means for normally holding them disengaged and means for automatically rendering said force exerting means inoperative when a predetermined overload is exerted on said clutch member.

H. EDGAR BROUSSEAU.